United States Patent
Lais et al.

(10) Patent No.: US 12,498,259 B2
(45) Date of Patent: Dec. 16, 2025

(54) SENSOR FOR DETECTING PRESSURE FLUCTUATIONS IN A FLOWING FLUID, AND MEASUREMENT SYSTEM FORMED THEREWITH

(71) Applicant: Endress+Hauser Flowtec AG, Reinach (CH)

(72) Inventors: Christian Lais, Eichstetten (DE); Pierre Ueberschlag, Saint-Louis (FR); Achim Wiest, Weil am Rhein (DE)

(73) Assignee: Endress+Hauser Flowtec AG, Reinach (CH)

( * ) Notice: Subject to any disclaimer, the term of this patent is extended or adjusted under 35 U.S.C. 154(b) by 283 days.

(21) Appl. No.: 18/258,280

(22) PCT Filed: Dec. 17, 2021

(86) PCT No.: PCT/EP2021/086361
§ 371 (c)(1),
(2) Date: Jun. 19, 2023

(87) PCT Pub. No.: WO2022/129447
PCT Pub. Date: Jun. 23, 2022

(65) Prior Publication Data
US 2024/0295422 A1    Sep. 5, 2024

(30) Foreign Application Priority Data

Dec. 18, 2020 (DE) .................. 10 2020 134 264.0

(51) Int. Cl.
| | | |
|---|---|---|
| *G01F 1/32* | (2022.01) | |
| *G01F 1/325* | (2022.01) | |
| G01F 15/00 | (2006.01) | |

(52) U.S. Cl.
CPC .......... *G01F 1/3266* (2022.01); *G01F 1/3209* (2013.01); *G01F 15/006* (2013.01)

(58) Field of Classification Search
CPC ......... G01F 1/32; G01F 1/3209; G01F 1/3218
See application file for complete search history.

(56) References Cited

U.S. PATENT DOCUMENTS

| | | |
|---|---|---|
| 5,313,843 A | 5/1994 | Tsuruoka et al. |
| 6,003,384 A | 12/1999 | Froehlich et al. |
| (Continued) | | |

FOREIGN PATENT DOCUMENTS

| | | |
|---|---|---|
| CN | 102322902 A | 1/2012 |
| CN | 106404082 A | 2/2017 |
| (Continued) | | |

OTHER PUBLICATIONS

Tang et al., High-temperature Vortex Street Non-glue Packaging Stress Type Sensor, Feb. 2017, FIT Machine Translation (Year: 2017).*

*Primary Examiner* — Erika J. Villaluna
(74) *Attorney, Agent, or Firm* — Christopher R. Powers; Endress+Hauser (USA) Holding, Inc.

(57) ABSTRACT

The sensor comprises: a flat deformation element including first and second planar surfaces; a sensor lug extending starting from the first surface; a connection sleeve extending from the deformation element; a transducer element, which is arranged within the connection sleeve and contacts the first surface with a contact surface, for generating an electrical sensor signal representing temporally changing movements of the sensor lug and/or temporally changing deformations of the deformation element; and a fastener positioned within the connection sleeve and mechanically connected thereto, for fixing the transducer element in the connection sleeve, wherein the fastener includes a spring assembly with at least two stacked disk springs, which are elastically deformed by exerting a pressing force which holds the transducer element against the deformation element.

32 Claims, 4 Drawing Sheets

(56) References Cited

U.S. PATENT DOCUMENTS

| | | | |
|---|---|---|---|
| 6,101,885 | A | 8/2000 | Touzin et al. |
| 6,352,000 | B1 | 3/2002 | Getman et al. |
| 6,910,387 | B2 | 6/2005 | Koudal |
| 6,938,496 | B2 | 9/2005 | Koudal et al. |
| 2006/0023084 | A1 | 2/2006 | Fukuda |
| 2008/0028849 | A1 | 2/2008 | Matsubara |
| 2008/0072686 | A1 | 3/2008 | Hoecker |
| 2011/0154913 | A1 | 6/2011 | Konyukhov et al. |
| 2011/0247430 | A1 | 10/2011 | Hertel et al. |
| 2016/0123783 | A1 | 5/2016 | Strub et al. |
| 2017/0284841 | A1 | 10/2017 | Lais et al. |
| 2019/0094054 | A1 | 3/2019 | Lais et al. |

FOREIGN PATENT DOCUMENTS

| | | | |
|---|---|---|---|
| CN | 206056677 | U | 3/2017 |
| CN | 206056677 | U1 | 3/2017 |
| CN | 108713130 | A | 10/2018 |
| DE | 102016104423 | A1 | 9/2017 |
| JP | 4361120 | A | 12/1992 |
| JP | 07128101 | A | 5/1995 |
| JP | 3114401 | B2 | 12/2000 |
| JP | 2001330484 | A | 11/2001 |
| JP | 4361120 | B2 | 11/2009 |
| TW | 315935 | U | 9/1997 |

\* cited by examiner

SENSOR FOR DETECTING PRESSURE FLUCTUATIONS IN A FLOWING FLUID, AND MEASUREMENT SYSTEM FORMED THEREWITH

CROSS-REFERENCE TO RELATED APPLICATIONS

The present application is related to and claims the priority benefit of German Patent Application No. 10 2020 134 264.0 filed on Dec. 18, 2020, and International Patent Application No. PCT/EP2021/086361, filed Dec. 17, 2021, the entire contents of which are incorporated herein by reference.

TECHNICAL FIELD

The invention relates to a formed sensor for detecting pressure fluctuations in a flowing fluid and, respectively, to a measurement system formed therewith.

BACKGROUND

In process measurement and automation technology, measurement systems designed as vortex flow meters are often used for the measurement of flow velocities of fluids flowing in pipes, especially, fast flowing and/or hot gases and/or fluid flows of high Reynolds number (Re), or of volume flow rates or mass flow rates corresponding to a respective flow velocity (u). Examples of such measurement systems are known, inter alia, from US-A 2006/0230841, US-A 2008/0072686, US-A 2011/0154913, US-A 2011/0247430, US-A 2016/0123783, US-A 2017/0284841, US-A 2019/0094054, US-A 60 03 384, US-A 61 01 885, US-B 63 52 000, US-B 69 10 387 or US-B 69 38 496 and are also offered, inter alia, by the applicant, for example under the trade name "PROWIRL D 200", "PROWIRL F 200", "PROWIRL O 200", "PROWIRL R 200" (http://www.de.endress.com/#products/prowirl).

Each of the measurement systems shown has a resistance element, which protrudes into the lumen of the respective pipe, namely, for example, designed as a system component of a heat supply network or of a turbine circuit or into a lumen of a measurement tube used in the course of said pipe, against which resistance element fluid flows to generate vortices that are lined up to form a so-called Kármán vortex street within the partial volume of the fluid flow flowing directly downstream of the resistance element. As is known, the vortices are generated at the resistance element at a separation rate ($1/f_{Vtx}$) that is dependent on the flow velocity. Furthermore, the measurement systems have a sensor that is integrated in the resistance element or connected therewith or downstream thereof, namely in the region of the Karman vortex street in the flow, thus projecting into lumens of, which sensor is used to detect pressure fluctuations in the Kármán vortex street formed in the flowing fluid and to convert them into a sensor signal representing the pressure fluctuations, namely to supply a—here, for example, electrical or optical—signal that corresponds to a pressure prevailing within the fluid, which, due to opposing vortices, is subjected to periodic fluctuations downstream of the resistance element, or has a signal frequency ($\sim f_{Ctx}$) corresponding to the separation rate of the vortices.

For this purpose, the sensor has a deformation element and a usually rod-shaped, planar or wedge-shaped sensor lug extending starting from a substantially planar surface of the deformation element, and is designed to detect pressure fluctuations in the Kármán vortex street, namely to convert them into movements of the deformation element corresponding to the pressure fluctuations. The deformation element has an outer edge segment, usually circular-ring-shaped, which is configured to be hermetically sealed, for example integrally bonded, to a socket that is used to hold the deformation element on a wall of a tube such that the deformation element covers and hermetically seals an opening provided in the wall of the tube and that the surface of the deformation element supporting the sensor lug faces the fluid-carrying lumen of the measurement tube or the pipe, and therefore the sensor lug projects into said lumen. The deformation element is typically designed as a thin membrane and is shaped such that at least one membrane thickness, measured as a minimum thickness of an inner membrane segment delimited by the above-mentioned outer edge segment, is much smaller than a membrane diameter, measured as a largest diameter of a surface delimited by the outer edge segment. In order to achieve the highest possible measurement sensitivity, namely a highest possible sensitivity of the sensor to the pressure fluctuations to be detected and, at the same time, an as high as possible mechanical natural frequency, which is above the highest separation rate to be measured, for the bending oscillation mode of the deformation element, which is forced by the pressure fluctuations, with the sensor lug, such deformation elements of established measurement systems typically have a diameter-to-thickness ratio, which is approximately on the order of 20:1. As shown, inter alia, in the above-mentioned US-A 2016/0123783, US-A 2017/0284841, US-A 2019/0094054 or US-B 63 52 000, sensors of the type in question can occasionally also have a usually rod-shaped, planar or sleeve-shaped compensating element that extends from a surface of the deformation element facing away from the surface supporting the sensor lug and is used especially to compensate for forces or moments resulting from movements of the sensor assembly, for example as a result of vibrations of the pipe, or to avoid undesired movements of the sensor lug resulting therefrom.

For the purpose of generating the sensor signal, each of the sensors further comprises a (mechanical-to-electrical) transducer element, which is typically configured to detect movements of the deformation element and convert them into an electrical sensor signal. In the sensors known from US-A 2017/0284841, US-A 2019/0094054 or US-B 63 52 000, said transducer element is formed by means of a piezo ceramic, for example in the form of a piezo disk.

On a side facing away from the fluid-carrying lumen, the sensor is furthermore connected to converter electronics, which are typically encapsulated in a pressure-tight and impact-proof manner and optionally also hermetically sealed towards the outside. Converter electronics of measurement systems that are suitable for industrial applications usually have a corresponding digital measurement circuit, which is electrically connected to the transducer element via connection lines, optionally with the interposition of electrical barriers and/or galvanic isolation points, for processing the at least one sensor signal generated by the transducer element and for generating digital measurement values for the measured variable to be detected in each case, namely the flow velocity, the volume flow rate and/or the mass flow rate. The converter electronics, usually accommodated in a protective housing made of metal and/or impact-resistant plastic, of measurement systems suitable for industry or established in industrial measurement technology also usually provide external interfaces conforming to an industry standard, for example DIN IEC 60381-1, for communication with higher-level measurement and/or regulator systems, for example formed by means of programmable-logic controllers (PLC). Such an external interface can be designed, for example, as a two-wire connection that can be incorporated into a current loop and/or be compatible with established industrial field buses.

Not least because of the relatively high diameter-to-thickness ratios of the deformation element, which are due to the measuring principle, conventional sensors of the type in question—even when using a high-strength nickel-based alloy, such as, e.g., Inconel 718 (Special Metals Corp.), as material—usually have a compressive strength, namely a maximum permissible operating pressure, above which a non-reversible plastic deformation of the sensor or even a bursting of the deformation element is to be provided, which may be too low for the extremely high pressures or pressure shocks that occasionally actually occur in certain applications, or such sensors show a dependence of said compressive strength on the operating temperature (pressure-temperature curve), which dependence is too inconvenient for such applications, such that, for example, for operating pressures above 100 bar, which occur in actually predestined hot steam applications with steam temperatures of above 200 C, nondestructive resistance can no longer be guaranteed occasionally, for example as a result of condensation-induced water hammers (CIWH).

To improve the compressive strength of the sensor, US-A 2016/0123783 discloses, for example, a support device for the deformation element, which is arranged on the transducer element side and is therefore not contacted during operation by the fluid to be measured, against which support device the deformation element is partially applied at a static pressure of, for example, more than 40 bar above a predetermined limit value, such that mechanical stresses established therein can be maintained below a specified maximum permissible voltage even at higher pressures of up to 250 bar. One disadvantage of this solution, however, is that the sensitivity of the sensor is initially reduced abruptly when the above-mentioned limit value is exceeded, and that therefore the sensor shows a sensitivity, which is dependent on the pressure and is also non-linear, to the flow velocity or the volume flow rate.

SUMMARY

Proceeding from this, one object of the invention is to improve sensors with the transducer element positioned on the deformation element such that they show a high compressive strength even in case of a comparatively simple mechanical structure, or a dependence of the compressive strength on the operating temperature that will allow for the sensors to be used even in hot steam applications with steam temperatures of above 200° C. and pressure peaks of above 100 bar. In addition, the sensor should be able to be assembled in a simple manner from individual components, for example also in order to be able to easily replace a defective transducer element against an intact new transducer element.

To achieve this object, the invention relates to a sensor, especially a sensor for detecting pressure fluctuations in a Kerman vortex street formed in a flowing fluid, which sensor comprises:
- a deformation element that is flat at least in sections, for example membrane-like or disk-shaped, made, for example, of a metal, having a planar first surface and an opposite planar second surface;
- a, for example, rod-shaped or planar or wedge-shaped sensor lug extending starting from the first surface of the deformation element;
- a connection sleeve made, for example, of a metal, which extends starting from the deformation element and is, for example, connected thereto in an electrically conductive manner;
- a, for example, disk-shaped and/or piezoceramic transducer element arranged within the connection sleeve and contacting the second surface of the deformation element with a first contact surface in a, for example, electrically conductive manner, for generating an electrical sensor signal representing temporally changing, for example at least temporarily periodic, movements of the sensor lug and/or temporally changing, for example at least temporarily periodic, deformations of the deformation element;
- and fastening means, which are positioned within the connection sleeve and are, for example releasably, mechanically connected thereto, for, for example releasably, fixing the transducer element in the connection sleeve.

In the sensor according to the invention, the fastening means comprise a, for example cylindrical, spring assembly formed by means of at least two disk springs arranged one on top of the other, and the disk springs are additionally elastically deformed by exerting a pressing force which holds the transducer element against the deformation element, for example in such a way that a minimum surface pressure acting on the transducer element is more than 1 MPa and/or a maximum surface pressure acting on the transducer element is less than 20 MPa and/or in such a way that a non-positive connection is formed between the transducer element and the deformation element.

In addition, the invention also relates to a measurement system formed by means of a sensor according to the invention that serves for detecting pressure fluctuations in the flowing fluid, namely, for example, for detecting pressure fluctuations in a Kerman vortex street formed in the flowing fluid, which measurement system is meant for measuring at least one, for example temporally variable, flow parameter, for example a flow velocity and/or a volume flow rate, of a fluid flowing in a pipeline, the measurement system further comprising a measurement electronics electrically connected to the transducer element of the sensor, which measurement electronics is designed to receive the sensor signal from the sensor and to process it, namely, for example, to generate measurement values representing the at least one flow parameter. The measurement system according to the invention can especially also be used for measuring a flow parameter—namely, for example, a flow velocity and/or a volume flow rate and/or a mass flow rate—of a fluid flowing in a pipeline, for example, at least temporarily a temperature of more than 200° C. and/or acting at least temporarily with a pressure of more than 100 bar on the deformation element and/or the sensor lug of the sensor, for example a steam.

According to a first embodiment of the sensor of the invention, it is further provided for the fastening means to comprise an (inner) screw sleeve having an external thread and for the connection sleeve to comprise an inner thread in a distal end remote from the deformation element, and for the (inner) screw sleeve to be screwed into the inner thread to form an abutment for the spring assembly.

According to a second embodiment of the sensor of the invention, it is further provided for the fastening means to comprise an (inner) locking ring and for the connection sleeve to comprise an (inner) groove in a region remote from the deformation element, and for the (inner) locking ring to be inserted into the (inner) groove to form an abutment for the spring assembly.

According to a third embodiment of the sensor of the invention, it is further provided for the deformation element and sensor lug to be integrally bonded to one another, namely, for example, welded or soldered to one another.

According to a fourth embodiment of the sensor of the invention, it is further provided for the transducer element and the deformation element to not be integrally bonded to one another.

According to a fifth embodiment of the sensor of the invention, it is further provided for the transducer element and the spring assembly to not be integrally bonded to one another.

According to a sixth embodiment of the sensor of the invention, it is further provided for the fastening means to comprise a, for example annular, insulating disk, for example of a ceramic and/or a plastic, and for the insulating disk to be positioned between the transducer element and spring assembly to form a.

According to a seventh embodiment of the sensor of the invention, it is further provided for the disk springs to consist of a metal, for example a nickel-based alloy.

According to an eighth embodiment of the sensor of the invention, it is further provided for the disk springs and the deformation element to consist of a same material.

According to a ninth embodiment of the sensor of the invention, it is further provided for the deformation element to consist at least partially, for example, predominantly or completely, of a metal, for example stainless steel or a nickel-based alloy.

According to a tenth embodiment of the sensor of the invention, it is further provided for the sensor lug to consist at least partially, for example, predominantly or completely, of a metal, for example stainless steel or a nickel-based alloy.

According to an eleventh embodiment of the sensor of the invention, it is further provided for the connection sleeve to consist at least partially, for example, predominantly or completely, of a metal, for example stainless steel or a nickel-based alloy.

According to a twelfth embodiment of the sensor of the invention, it is further provided for the deformation element and sensor lug, for example the connection sleeve, deformation element and sensor lug, to consist of a same material.

According to a thirteenth embodiment of the sensor of the invention, it is further provided for the deformation element and sensor lug, for example the connection sleeve, deformation element and sensor lug, to be components of one and the same monolithic molded part.

According to a fourteenth embodiment of the sensor of the invention, it is further provided for a minimum surface pressure acting on the transducer element to be more than 1 MPa, for example more 3 MPa.

According to a fifteenth embodiment of the sensor of the invention, it is further provided for a maximum surface pressure acting on the transducer element to be less than 20 MPa, for example less than 15 MPa.

According to a sixteenth embodiment of the sensor of the invention, it is further provided for the transducer element to contact the deformation elements and/or the connection sleeve in an electrically conductive manner.

According to a first development of the invention, the sensor further comprises a metal foil, for example a silver foil.

According to a second development of the invention, the sensor further comprises a, for example, rod-shaped or planar or sleeve-shaped compensating element extending from the second surface of the deformation element for compensating forces and/or torques resulting from common movements of the deformation element and the sensor lug.

According to a first embodiment of the first development of the invention, it is further provided for the compensating element to extend through the spring assembly, for example in such a way that a main axis of inertia (namely, for example, a longitudinal axis) of the compensating element and a main axis of inertia (namely, for example, a longitudinal axis) of the spring assembly, run parallel to one another, namely, for example, to be coincident, and/or in such a way that the spring assembly and the compensating element do not contact one another.

According to a second embodiment of the first development of the invention, it is further provided for the deformation element and compensating element to be integrally bonded to one another, namely, for example, welded or soldered to one another.

According to a third embodiment of the first development of the invention, it is further provided for the sensor lug and the compensating element to be arranged in alignment with one another. According to a fourth embodiment of the first development of the invention, it is further provided for the compensating element and the deformation element to be positioned and aligned with respect to one another in such a way that a main axis of inertia of the deformation element extends as an extension parallel to a main axis of inertia of the compensating element, namely, for example, coincides therewith.

According to a fifth embodiment of the first development of the invention, it is further provided for the deformation element and the compensating element to be components of one and the same monolithic molded part, for example in such a way that the sensor lug, deformation element and compensating element and/or that the connection sleeve, deformation element and compensating element are components of said molded part.

According to a sixth embodiment of the first development of the invention, it is further provided for the compensating element to consist at least partially, for example, predominantly or completely, of a metal, for example stainless steel or a nickel-based alloy.

According to a seventh embodiment of the first development of the invention, it is further provided for the deformation element and the compensating element to consist of a same material, for example such that the sensor lug, deformation element and compensating element and/or the connection sleeve, deformation element and compensating element consist of the same material.

According to a third development of the invention, the measurement system further comprises a tube which can be inserted into the course of said pipeline and has a lumen which is designed to guide the fluid flowing in the pipeline.

According to a first embodiment of the first development of the invention, it is further provided for the sensor to be inserted into said tube in such a way that the first surface of the deformation element faces the lumen of the tube and that the sensor lug projects into said lumen.

According to a second embodiment of the first development of the invention, it is further provided that an opening is formed in the wall of the tube, especially an opening having a socket which serves to hold the deformation element on the wall, and that the sensor is inserted into said opening in such a way that the deformation element covers, namely, especially, hermetically seals, the opening, and that the first surface of the deformation element faces the lumen of the tube, and therefore the sensor lug projects into said lumen.

According to a third embodiment of the first development of the invention, it is further provided for the sensor lug to have a length, measured as a minimum distance between a proximal end of the sensor lug, which end adjoins the deformation element, up to a distal end of the sensor lug, which end is remote from the deformation element or its surface, which length corresponds to less than 95% of a caliber of the tube and/or more than one half of said caliber.

According to a fourth embodiment of the third development of the invention, it is further provided for the measurement system to further have a resistance element arranged in the lumen of the tube, for example upstream, namely in the (main) direction of flow upstream of the sensor, which resistance element is designed to bring about a Kármán vortex street in the flowing fluid, wherein the sensor is configured to detect periodic pressure fluctuations in the Kármán vortex street and convert them into a sensor signal, for example in such a way that the sensor signal has a signal frequency corresponding to a separation rate of vortexes on the resistance element, which vortexes form the Kármán vortex street.

A basic idea of the invention is to bring about the desired high nominal compressive strength for sensors, not least even at high operating temperatures of above 200° C., or the desired improvement of the dependence of the pressure resistance of the sensor assembly on the operating temperature (pressure-temperature curve of the sensor assembly) by the fact that a the transducer element arranged on the deformation element is held pressed against the deformation element by means of a spring assembly formed from disk springs. One of the advantages of the invention is not only that it can result in a significant improvement in the nominal compressive strength or in the pressure-temperature curve of sensors of the type in question, but that this is achieved without notably reducing the measurement sensitivity, i.e., the sensitivity of the sensor to the pressure fluctuations actually to be detected. Another advantage of the invention is also to be seen in the fact that, with the sensor according to the invention, defective components, for example the transducer element or the fastening means, can be replaced very easily, for example, even on site.

BRIEF DESCRIPTION OF THE DRAWINGS

The invention as well as advantageous embodiments thereof are explained in more detail below based upon exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or further developments, especially combinations of partial aspects of the invention that were initially explained only separately, furthermore emerge from the figures of the drawing and/or from the claims. In the figures in detail:

DETAILED DESCRIPTION

Figure 1:
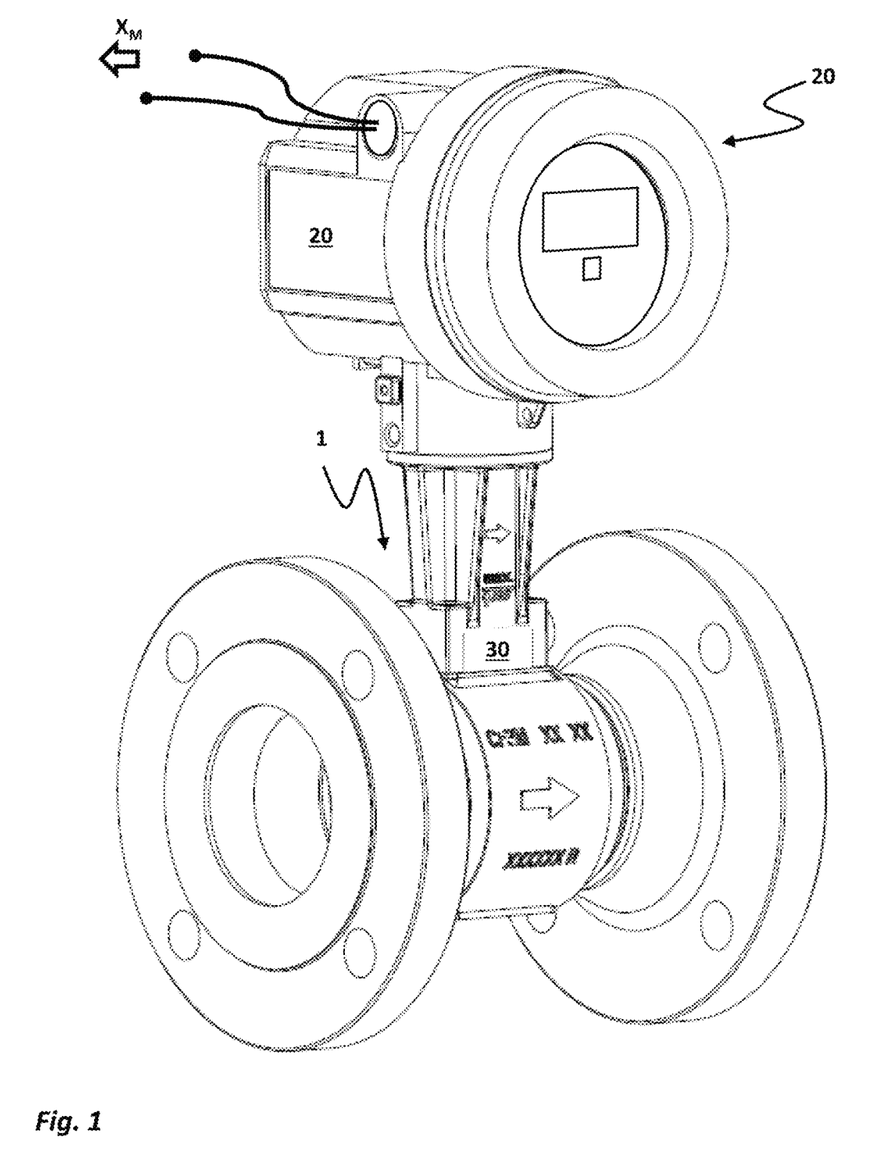
FIGS. 1 and 2 show various schematic views of an exemplary embodiment of a measurement system according to the present disclosure in the form of a vortex flow meter, having a sensor and measurement electronics for measuring at least one flow parameter of a fluid flowing in a pipeline.
Figure 2:
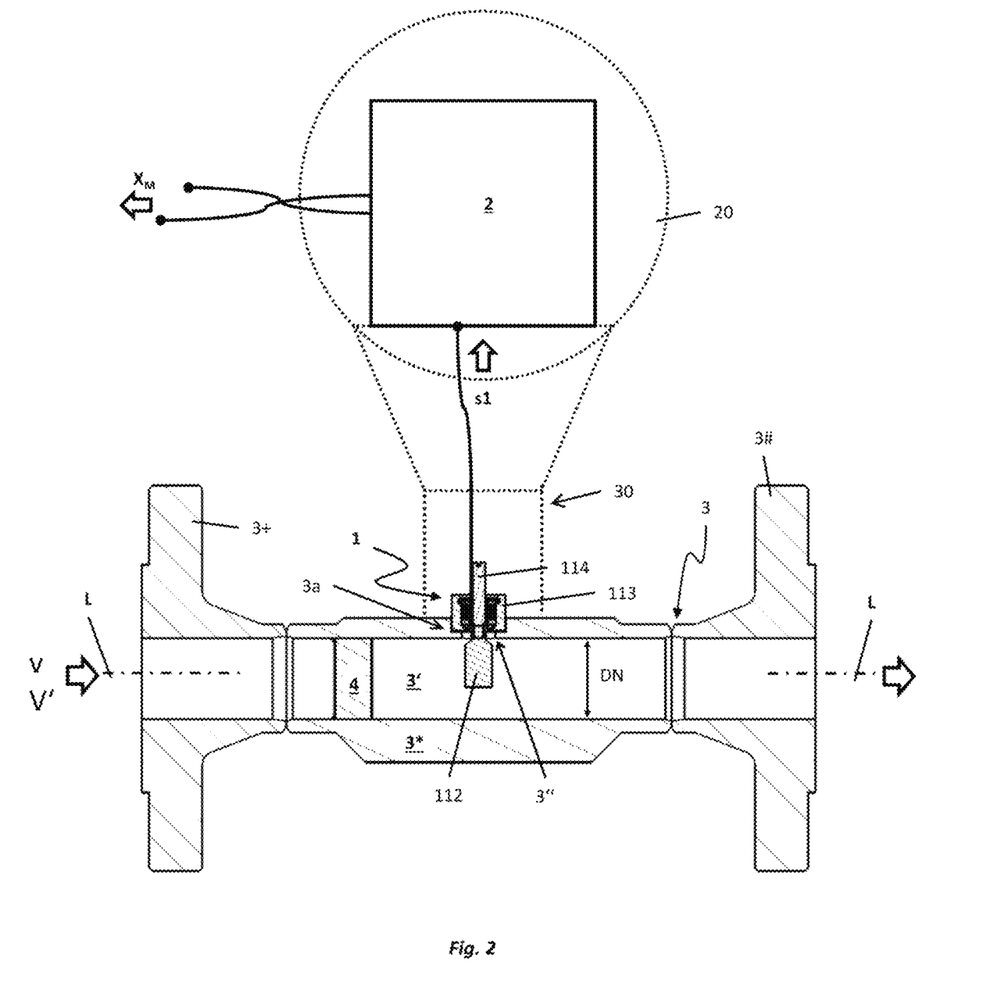

FIGS. 1 and 2 show an exemplary embodiment of a measurement system for measuring at least one flow parameter, possibly also variable over time, such as a flow velocity v and/or a volume flow rate V', a fluid flowing in a pipeline, for example a hot gas having, especially, at least temporarily a temperature of more than 200° C., and/or being at least temporarily under a high pressure, especially, of more than 100 bar. The pipe can be designed, for example, as a plant component of a heat supply network or of a turbine circuit, and therefore the fluid can be, for example, steam, especially saturated steam or superheated steam, or else, for example, a condensate discharged from a steam line. However, fluid can also be, for example, (compressed) natural gas or a biogas, so that the pipe can also be a component of a natural gas or biogas plant or of a gas supply network, for example.

Figure 3:
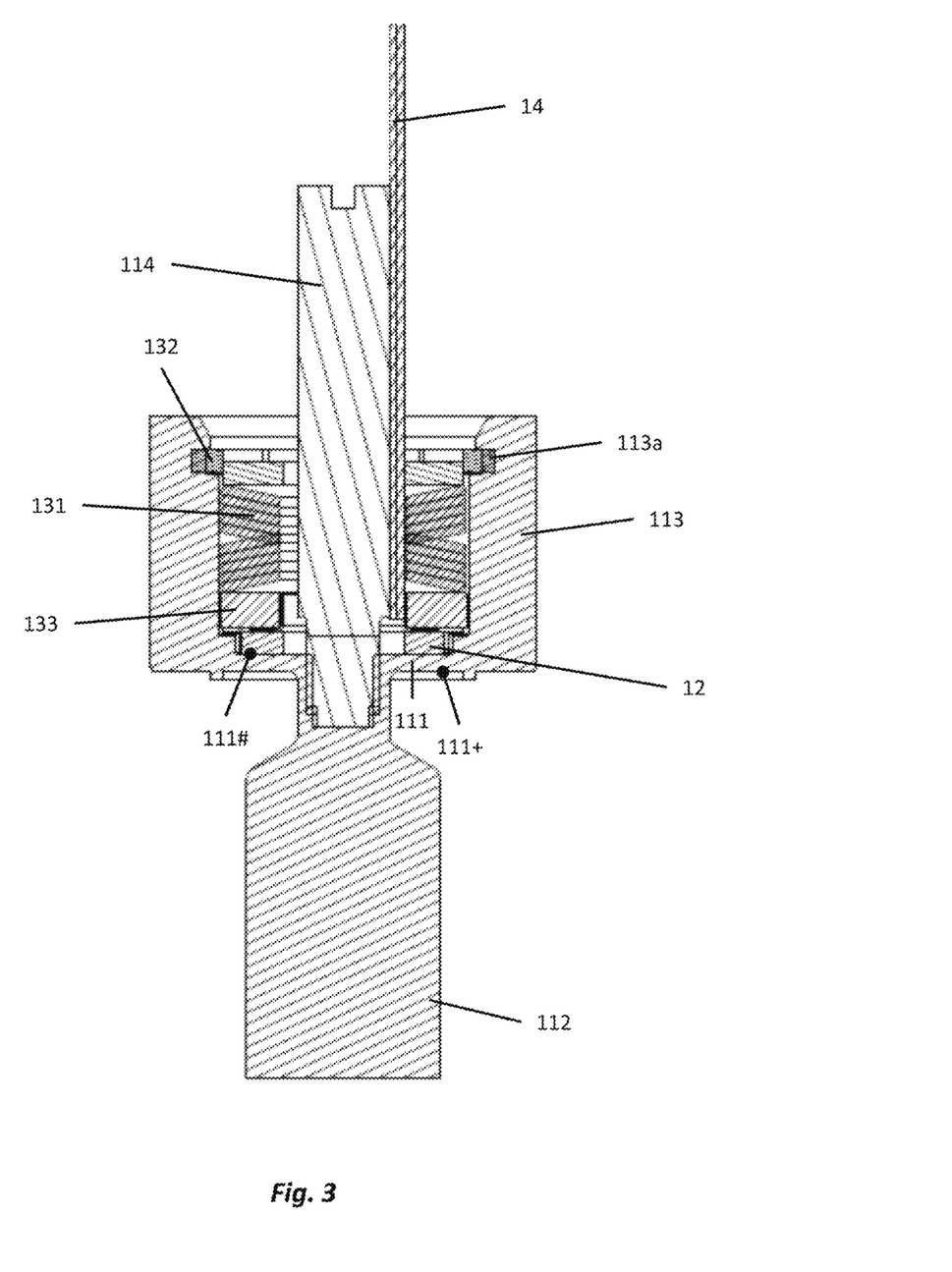
FIG. 3 schematically shows, in a cut-away side view, an exemplary embodiment of a sensor suitable for use in a measurement system according to FIG. 1 or 2.

The measurement system has a sensor 1, shown again enlarged in FIG. 3, which is provided or configured to detect pressure fluctuations in the fluid flowing past the sensor in a (main) flow direction and to convert it into a sensor signal s1 corresponding to said pressure fluctuations, for example, an electrical or optical sensor signal s1. As is apparent from FIGS. 1 and 2 when viewed together, the measurement system furthermore comprises measurement electronics 2—for example accommodated in a pressure-resistant and/or impact-resistant protective housing 20—which is electrically connected to the sensor 1 or communicates with the sensor 1 during operation of the measurement system. The measurement electronics 2 is, especially, configured to receive and process the sensor signal s1, namely, for example, to generate measurement values $X_M$ representing the at least one flow parameter, i.e., for example, the flow velocity v or the volume flow rate V'. The measurement values $X_M$ can, for example, be visualized in situ and/or be transmitted in a wired manner via a connected field bus and/or in a wireless manner via radio to an electronic data processing system, for example a programmable logic controller (PLC) and/or a process control station. The protective housing 20 for the measurement electronics 2 can, for example, be produced from a metal, such as stainless steel or aluminum, and/or by means of a casting method, such as an investment casting or die casting method (HPDC); it can however, for example, also be formed by means of a plastic molded part produced in an injection molding method.

As shown in FIG. 3 or as readily apparent from FIGS. 2 and 3 when viewed together, the sensor 1 comprises an, especially, membrane-like or disk-shaped deformation element 111 as well as a sensor lug 112 having a left-side first side face and a right-side second side face, which, starting from a first surface 111+ of the deformation element 111, extends up to a distal (free) end that is namely remote from the deformation element 111 or its surface 111+. The deformation element 111 further has a second surface 111 #, which is opposite the first surface 111+, for example at least partially parallel to the first surface 111+. The deformation element 111 and the sensor lug 112 can be, for example, parts of one and the same monolithic molded part that is cast or produced by an additive manufacturing process such as 3D laser melting, for example; however, the deformation element and the sensor lug can also be designed as individual parts that are initially separate from one another and are only subsequently integrally bonded to one another, namely, for example, welded or soldered to one another, and therefore produced from materials that can correspondingly be integrally bonded to one another. The deformation element 111 can consist at least partially, namely, for example, predominantly or completely, of a metal such as stainless steel or a nickel-based alloy. The sensor lug can likewise consist at least partially of a metal, namely, for example, stainless steel or a nickel-based alloy; the deformation element 111 and the sensor lug 112 can especially also be produced from the same material. The deformation element 111 and the sensor lug 112 are moreover, especially, configured to be excited to, typically forced, oscillations about a common static rest position in such a way that the sensor lug 112 executes pendular movements that elastically deform the deformation element 111 in a detection direction running substantially transversely to the aforementioned flow direction. The sensor lug 112 accordingly has a width, measured as a maximum extent in the direction of the flow direction, which is substantially greater than a thickness of the sensor lug 112, measured as a maximum lateral extent in the direction of the detection direction. Moreover, the sensor lug 112 can be designed, for example, as a wedge-shaped or also as a relatively thin planar plate, as is quite common with such sensors.

Apart from the sensor lug 112 and the deformation element 111, the sensor 1 furthermore has a connection sleeve 113 extending from a circular circumferential edge segment of the second surface 111 # of the deformation element, which edge segment extends, for example, circularly. In order to detect oscillations of the deformation element 111 and the sensor lug, the sensor furthermore has at least one, especially disk-shaped and/or piezoceramic, transducer element 12, which is arranged within the connection sleeve 113 and contacts the surface 111+ of the deformation element with a first contact surface, for generating an electrical sensor signal representing temporally changing, especially at least temporarily periodic, movements of the sensor lug and/or likewise temporally changing, especially at least temporarily periodic, deformations of the deformation element 111, for example with an electrical (alternating) voltage corresponding to the aforementioned movements.

As already mentioned, the sensor 1 or the measurement system formed therewith is, especially, also intended to be used in such measuring points, where in the fluid to be measured, for example due to condensation-induced water hammers (CIWH), extremely high hydrostatic pressures, namely pressures of more than 100 bar acting perpendicularly against the wall 3* of the tube and therefore acting likewise against the sensor, can occur temporarily, namely, for example, in hot steam applications with fluid temperatures of above 200° C. In order to, especially, releasably fix the transducer element 12 in the connection sleeve 112, on the one hand, and to achieve an as low as possible sensitivity of the sensor to pressure shocks and/or temperature fluctuations or to reduce measuring errors resulting from such high loads on the sensor during measurement of the at least one flow parameter with the measurement system formed with the sensor, on the other hand, the sensor according to the invention further comprises fastening means 13 positioned within the connection sleeve 112 and thus, especially releasably, mechanically connected thereto. In the sensor according to the invention, the fastening means 13 comprise a, for example cylindrical, spring assembly 131 (spring stack) formed by means of two or more plate springs stacked on top of one another, wherein the disk springs (in the installed state) are elastically deformed by exerting a pressing force which holds the transducer element against the deformation element, as a result of which a non-positive connection is formed between the transducer element and the deformation element; this, especially, such that a minimum surface pressure acting on the transducer element 12 is more than 1 MPa, especially more 3 MPa, and/or a maximum surface pressure acting on the transducer element 12 is less than 20 MPa, especially less than 15 MPa.

According to another embodiment of the invention, it is further provided for the disk springs and the deformation element to consist of a same material. Alternatively or additionally, the disk springs can advantageously be made of a metal, namely, for example, stainless steel or a nickel-based alloy such as X7 CrNiAl 17-7 (WsNr 1.4568, EN 10027-2:1992-09).

Figure 4A:
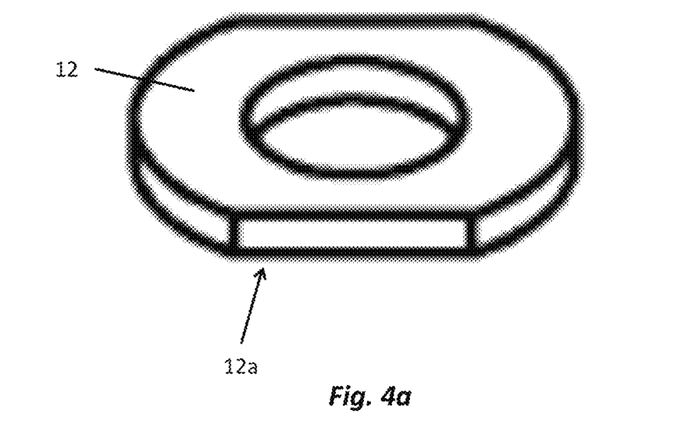
FIGS. 4a and 4b schematically show, in two different side views, an exemplary embodiment of a sensor according to FIG. 3 suitable transducer element.
Figure 4B:
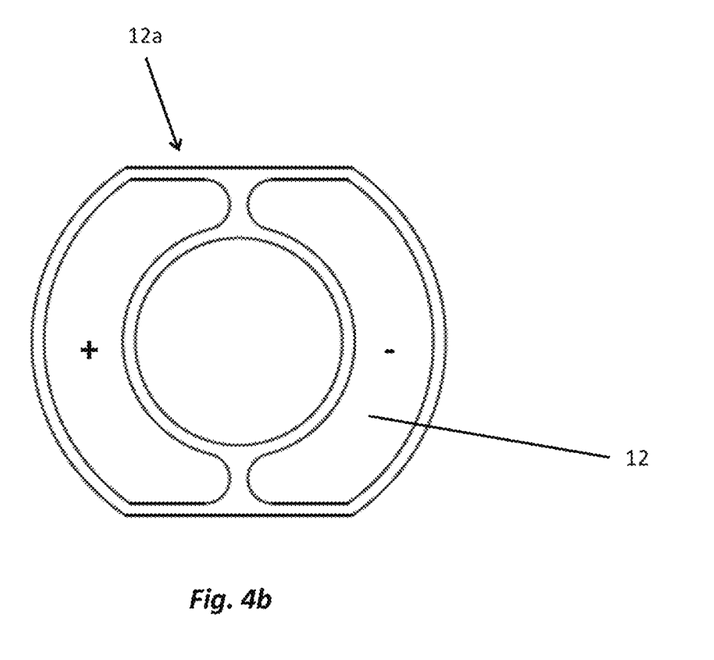

In order to prevent a lateral displacement of the transducer element 12 in the installation position relative to the deformation element 111 or to the connection sleeve 113, the connection sleeve 113 and the transducer element 12 can advantageously also be designed such that an inner diameter of the connection sleeve 113 in the region of the installation position of the transducer element substantially corresponds to an outer diameter of the transducer element corresponding thereto, namely, for example, that said inner diameter is larger only by an amount which barely allows for positioning the transducer element 12 on the deformation element 111. In order to facilitate positioning of the transducer element 12, the connection sleeve can further be designed such that it has a (smallest) inner diameter in a region above the transducer element 12 (positioned in the installed position), which is greater than a (largest) outer diameter of the transducer element, for example by more than 1 mm. In order to ensure correct orientation of the transducer element 12 in the installation position, not least also with regard to an electrical polarization of the ceramic forming the transducer element 12 or with regard to a correct position of positively (+) or negatively (−) polarized partial regions of the transducer element 12, the transducer element 12 and the connection sleeve 113 can also be shaped such that the transducer element 12 and the connection sleeve 113 have outer or inner contours that are complementary to each other, but nevertheless prevent an incorrect installation position of the transducer element, for example such that, as shown in FIGS. 4a and 4b or as apparent from those FIGS. when viewed together, the transducer element 12 has an outer contour with one or more straight sections 12a, and that the connection sleeve has an inner contour with straight sections corresponding to the above-mentioned straight sections of the transducer element 12.

According to a further embodiment of the invention, the fastening means 13 comprise an (inner) locking ring 132 and the connection sleeve 113 comprises, in a region remote from the deformation element 111, a corresponding annular or circumferential (inner) groove 113a, wherein the (inner) locking ring is inserted into the (inner) groove to form an abutment for the spring assembly. Alternatively or additionally, the fastening means 13 can also comprise an (inner) screw sleeve having an external thread, and the connection sleeve can comprise an inner thread in a distal end remote from the deformation element 111, such that the (inner) screw sleeve is screwed into the inner thread to form an abutment for the spring assembly 131.

By using such fastening means formed by means of a spring assembly 131 comprising disk springs, it is also possible, inter alia, to fix the transducer element 12 on the deformation element without the transducer element 12 and the deformation element 111 being or having to be integrally bonded to one another, and therefore, for example, the use of adhesives for connecting the transducer element 12 and the deformation element 111 can be dispensed with. Likewise, the spring assembly 131 and the transducer element 12 can also be bonded to one another in a non-integral manner, namely by avoiding an adhesive bond that would bond the spring assembly and transducer element to one another; therefore the use of adhesives can be dispensed with here, as well. On the other hand, the use according to the invention of the spring assembly 131, however, also makes it easily possible to position a metal foil, for example a silver foil, between the transducer element 12 and the deformation element 111, which foil serves to bring about an electrically good conductive connection between the transducer element 12 and the deformation element 111 and/or to bring about an as uniform as possible mechanical contact between the transducer element 12 and the deformation element 111.

Furthermore, it is also readily possible to place further elements of the fastening means 13 between the transducer element 12 and the spring assembly 131, namely, for example, electrically and/or thermally insulating disks and/or a contact disk for electrically connecting an electrical connecting line leading to the transducer element, for example in such a way that the contact disks contact a second contact surface of the transducer element opposite the previously mentioned first contact surface of the transducer element in an electrically conductive manner. According to a further embodiment of the invention, the fastening means accordingly comprise a, for example annular, insulating disk, especially made of a ceramic and/or a plastic, which is positioned between the transducer element 12 and the spring assembly 131, and/or the fastening means comprise a contact disk 133 with an electrical connecting line 14 connected thereto in an electrically conductive manner.

According to a further embodiment of the invention, the measurement system further comprises a tube 3 that can be inserted in the course of the aforementioned pipe and has a lumen 3' that is surrounded by a wall 3*, for example a metallic wall, of the tube and extends from an inlet end 3+ to an outlet end 3 # and is configured to guide the fluid flowing in the pipe. The sensor 1 is moreover inserted into said tube in such a way that the first surface of the deformation element 111 faces the lumen 3' of the tube, so that the sensor lug projects into said lumen. In the exemplary embodiment shown here, there is at both the inlet end 3+ and the outlet end 3 # a flange, which is used in each case to produce a leak-free flange connection to a respective corresponding flange on an inlet-side or outlet-side line segment of the pipe. Furthermore, as shown in FIG. 1 or 2, the tube 3 can be substantially straight, namely, for example, in the form of a hollow cylinder with a circular cross section in such a way that the tube 3 has an imaginary straight longitudinal axis L connecting the inlet end 3+ and the outlet end 3 #. In the exemplary embodiment shown in FIGS. 1 and 2, respectively, the sensor 1 is inserted into the lumen of the tube from the outside through an opening 3" formed in the wall and is fixed, for example also releasably, from the outside to the wall 3* in the region of said opening in such a way that the surface 111+ of the deformation element 111 faces the lumen 3' of the tube 3 and therefore the sensor lug 112 protrudes into said lumen. Especially, the sensor 1 is inserted into the opening 3" in such a way that the deformation element 111 covers or hermetically seals the opening 3". Said opening can be designed, for example, in such a way that it has, as is quite usual in measurement systems of the type in question, an (inner) diameter in a range between 10 mm and approximately 50 mm. According to a further embodiment of the invention, a socket 3a used to hold the deformation element 111 or the sensor 1 formed therewith on the wall 3* is formed in the opening 3". In this case, the sensor 1 can, for example, be fixed to the tube 3 by integral bonding, especially by welding or soldering, of the deformation element 111 and wall 3*; however, it can for example also be detachably connected to the tube 3, namely, for example, screwed thereto or screwed thereon. Furthermore, at least one sealing face, for example also a circumferential or circular-ring-shaped sealing face, can be formed in the socket 3a and is configured to seal the opening 3" correspondingly in cooperation with the deformation element 111 and an optionally provided, for example annular or annular disk-shaped, sealing element. According to a further embodiment of the invention, the sensor 1 and the tube 3 are further dimensioned such that a length of the sensor lug 112, measured as the minimum distance between a proximal end of the sensor lug 112, namely the end bordering the deformation element 111 and the distal end of the sensor lug 112, corresponds to more than half of a caliber DN of the tube 3 and less than 95% of said caliber DN. For example, the length of the sensor lug 112 can also be selected, as is quite usual with a comparatively small caliber of less than 50 mm, in such a way that said distal end of the sensor lug 112 has only a very small minimum distance from the wall 3* of the tube 3. In the case of tubes with a comparatively large caliber of 50 mm or more, the sensor lug 112 can also, as is quite usual in the case of measurement systems of the type in question or as can also be seen from FIG. 2, be significantly shorter than half of a caliber of the tube 3, for example.

In the exemplary embodiment shown in FIGS. 1 and 2, respectively, the measurement system is specifically designed as a vortex flow meter with a resistance element 4 arranged in the lumen of the tube 3—here, namely, upstream of sensor 1, namely in the (main) direction of flow upstream of the sensor—and serving to bring about a Kármán vortex street in the flowing fluid. Here, the sensor and the resistance element are, especially, dimensioned and arranged such that the sensor lug 112 projects into the lumen 3* of the tube, or into the fluid conducted, in such a region which during operation of the measurement system is regularly taken up a (stationarily formed) Kerman vortex street, so that the pressure fluctuations detected by means of the sensor are periodic pressure fluctuations caused by vortices shed at the resistance element 4 at a separation rate ($\sim 1/f_{V_{tx}}$), and the sensor signal s1 has a signal frequency ($\sim f_{V_{tx}}$) corresponding to the separation rate of said vortices. In the exemplary embodiment shown here, the vortex flow meter is moreover designed as a compact-type measurement system in which the measurement electronics 2 are accommodated in a protective housing 20 held on the tube, for example by means of a neck-like connection piece 30.

According to a further embodiment of the invention, in order to compensate for forces and/or moments resulting from random movements of the sensor, for example as a result of vibration of the aforementioned pipe connected to the tube, or to avoid undesired movements of the sensor lug or of the deformation element 111 resulting therefrom, namely distorting the sensor signal s1, the sensor 1 further has a compensating element 114, for example a rod-shaped, planar or sleeve-shaped compensating element, extending from the second surface 111 # of the deformation element 111. The compensating element 114 can, for example, consist of the same material as the deformation element and/or the sensor lug, for example a metal. For example, the compensating element 114 can be produced from stainless steel or a nickel-based alloy. According to a further embodiment of the invention, the deformation element 111 and the compensating element 114 are integrally bonded to one another, for example welded or soldered to one another, and therefore the compensating element 114 and the deformation element 111 are produced from materials that can be integrally bonded to one another accordingly. Alternatively, however, the deformation element 111 and the compensating element 114 can also be components of one and the same monolithic molded part, for example also in such a way that the sensor lug 111, the deformation element 112 and the compensating element 114 are components of said molded part. The sensor lug 112 and the compensating element 114 can also be arranged in alignment with one another, as can also be seen by viewing FIGS. 3c and 3d together, in such a way that a main axis of inertia of the sensor lug 112 coincides in extension with a main axis of inertia of the compensating element 114. Alternatively or in addition, the compensating element 114 and the deformation element 111 can also be positioned and aligned with one another such that a main axis of inertia of the deformation element 111 coincides in extension with a main axis of inertia of the compensating element 114. According to a further embodiment of the invention, the compensating element and the spring assembly are designed and arranged such that the compensating element extends through the spring assembly, for example in such a way that a main axis of inertia, namely, for example, a longitudinal axis of the compensating element and a main axis of inertia, namely, for example, a longitudinal axis of the spring assembly, run parallel to one another, namely, for example, to be coincident, and/or in such a way that the spring assembly and the compensating element do not contact one another.

The invention claimed is:

1. A sensor for detecting pressure fluctuations in a Kármán vortex street formed in a flowing fluid, the sensor comprising:
    a deformation element, which is flat at least in sections, and includes a planar first surface and an opposite planar second surface;
    a sensor lug extending from the first surface of the deformation element;
    a connection sleeve extending from the deformation element;
    a transducer element disposed within the connection sleeve and contacting the second surface of the deformation element with a first contact surface as to generate an electrical sensor signal representing temporally changing movements of the sensor lug and/or temporally changing deformations of the deformation element; and
    a fastener disposed within the connection sleeve and mechanically connected thereto and configured to fix the transducer element in the connection sleeve,
    wherein the fastener includes a cylindrical spring assembly formed of at least two stacked disk springs and an inner screw sleeve including an external thread,
    wherein the connection sleeve includes an inner thread in a distal end remote from the deformation element, and the inner screw sleeve is screwed into the inner thread to form an abutment configured to contact the spring assembly, and
    wherein the disk springs are adapted to elastically deform by exerting a pressing force, which holds the transducer element against the deformation element.

2. The sensor according to claim 1, wherein the deformation element and the sensor lug are integrally bonded to each other; and/or
    wherein the transducer element and the deformation element are not integrally bonded to each other; and/or
    wherein the transducer element and the spring assembly are not integrally bonded to each other.

3. The sensor according to claim 1, wherein the fastener comprises a ring-shaped, insulating disk made of a ceramic and/or a plastic; and
    wherein the insulating disk is disposed between the transducer element and the spring assembly.

4. The sensor according to claim 1, wherein a minimum surface pressure acting on the transducer element is more than 1 MPa, especially more 3 MPa; and/or
    wherein a maximum surface pressure acting on the transducer element is less than 20 MPa, especially less than 15 MPa.

5. The sensor according to claim 1, wherein a minimum surface pressure acting on the transducer element is more than 3 MPa; and/or
    wherein a maximum surface pressure acting on the transducer element is less than 15 MPa.

6. The sensor according to claim 1, further comprising a metal foil disposed between the transducer element and the deformation element such that the foil facilitates an electrically conductive connection between the transducer element and the deformation element and/or facilitates a substantially uniform mechanical contact between the transducer element and the deformation element.

7. The sensor according to claim 1, wherein the transducer element contacts the deformation element and/or the connection sleeve in an electrically conductive manner.

8. The sensor according to claim 1, wherein at least one of:
    the disk springs of the fastener are made of a stainless steel or a nickel-based alloy;
    the disk springs of the fastener and the deformation element are made of a same material;
    the deformation element comprises a stainless steel or a nickel-based alloy;
    the sensor lug comprises a stainless steel or a nickel-based alloy;
    the connection sleeve comprises a stainless steel or a nickel-based alloy;
    the deformation element and the sensor lug comprise a same material;
    the deformation element and the connection sleeve compromise a same material;
    the deformation element and the sensor lug are portions of one and the same monolithic molded part; and
    the deformation element and the connection sleeve are portions of one and the same monolithic molded part.

9. A measuring system for measuring at least one flow parameter that is variable over time of a flow velocity, a volumetric flow, and/or a mass flow rate, of a fluid flowing in a pipe, the measuring system comprising:
    the sensor according to claim 1 configured to detect pressure fluctuations in the flowing fluid by detecting pressure fluctuations in a Kármán vortex street formed in the flowing fluid; and
    a measuring electronics electrically connected to the transducer element of the sensor, the measuring electronics configured to receive the sensor signal from the sensor and to process sensor signal as to generate measurement values representing the at least one flow parameter.

10. The measurement system according to claim 9, further comprising a tube configured to be inserted into a course of the pipeline, the tube including a lumen adapted to guide the fluid flowing in the pipeline, wherein the sensor is disposed in the tube such that the first surface of the deformation element faces the lumen of the tube and such that the sensor lug projects into the lumen.

11. The measurement system according to claim 10, further comprising a resistance element disposed in the lumen of the tube upstream of the sensor, relative to a direction of flow of the fluid, which resistance element is configured to generate about a Kármán vortex street in the flowing fluid.

12. The measurement system according to claim 10, wherein the sensor lug has a length measured as a minimum distance between a proximal end of the sensor lug, which proximal end adjoins the deformation element, to a distal end of the sensor lug, which distal end is remote from the deformation element or the first surface of the deformation element, wherein the length corresponds to less than 95% of a caliber of the tube and/or more than one half of the caliber of the tube.

13. The measurement system according to claim 9, further comprising a tube configured to be inserted into a course of the pipeline, the tube including a lumen adapted to guide the fluid flowing in the pipeline,
wherein a wall of the tube including an opening, the opening including a socket configured to hold the deformation element on the wall, and
wherein the sensor is disposed in the opening such that the deformation element covers and hermetically seals the opening and such that the first surface of the deformation element faces the lumen of the tube, wherein the sensor lug projects into the lumen.

14. The sensor according to claim 1, wherein the fastener comprises a ring-shaped, insulating disk made of a ceramic and/or a plastic; and
wherein the insulating disk is disposed between the transducer element and the spring assembly.

15. The sensor according to claim 1, wherein a minimum surface pressure acting on the transducer element is more than 1 MPa, especially more 3 MPa; and/or
wherein a maximum surface pressure acting on the transducer element is less than 20 MPa, especially less than 15 MPa.

16. The sensor according to claim 1, wherein a minimum surface pressure acting on the transducer element is more than 3 MPa; and/or
wherein a maximum surface pressure acting on the transducer element is less than 15 MPa.

17. The sensor according to claim 1, further comprising a metal foil disposed between the transducer element and the deformation element such that the foil facilitates an electrically conductive connection between the transducer element and the deformation element and/or facilitates a substantially uniform mechanical contact between the transducer element and the deformation element.

18. The sensor according to claim 1, wherein the transducer element contacts the deformation element and/or the connection sleeve in an electrically conductive manner.

19. The sensor according to claim 1, wherein at least one of:
the disk springs of the fastener are made of a stainless steel or a nickel-based alloy;
the disk springs of the fastener and the deformation element are made of a same material;
the deformation element comprises a stainless steel or a nickel-based alloy;
the sensor lug comprises a stainless steel or a nickel-based alloy;
the connection sleeve comprises a stainless steel or a nickel-based alloy;
the deformation element and the sensor lug comprise a same material;
the deformation element and the connection sleeve compromise a same material;
the deformation element and the sensor lug are portions of one and the same monolithic molded part; and
the deformation element and the connection sleeve are portions of one and the same monolithic molded part.

20. A sensor for detecting pressure fluctuations in a Kármán vortex street formed in a flowing fluid, the sensor comprising:
a deformation element, which is flat at least in sections and includes a planar first surface and an opposite planar second surface;
a sensor lug extending from the first surface of the deformation element;
a connection sleeve extending from the deformation element;
a transducer element disposed within the connection sleeve and contacting the second surface of the deformation element with a first contact surface as to generate an electrical sensor signal representing temporally changing movements of the sensor lug and/or temporally changing deformations of the deformation element; and
a fastener disposed within the connection sleeve and mechanically connected thereto and configured to fix the transducer element in the connection sleeve,
wherein:
the fastener includes a cylindrical spring assembly formed of at least two stacked disk springs and an inner locking ring,
the connection sleeve includes an inner groove in a region remote from the deformation element, and
the inner locking ring is inserted into the inner groove to form an abutment configured to contact the spring assembly, and
the disk springs are adapted to elastically deform by exerting a pressing force, which holds the transducer element against the deformation element.

21. The sensor according to claim 20, wherein the deformation element and the sensor lug are integrally bonded to each other; and/or
wherein the transducer element and the deformation element are not integrally bonded to each other; and/or
wherein the transducer element and the spring assembly are not integrally bonded to each other.

22. A measuring system for measuring at least one flow parameter that is variable over time of a flow velocity, a volumetric flow, and/or a mass flow rate, of a fluid flowing in a pipe, the measuring system comprising:
the sensor according to claim 20 configured to detect pressure fluctuations in the flowing fluid by detecting pressure fluctuations in a Kármán vortex street formed in the flowing fluid; and
a measuring electronics electrically connected to the transducer element of the sensor, the measuring electronics configured to receive the sensor signal from the sensor and to process sensor signal as to generate measurement values representing the at least one flow parameter.

23. The measurement system according to claim 22, further comprising a tube configured to be inserted into a course of the pipeline, the tube including a lumen adapted to guide the fluid flowing in the pipeline, wherein the sensor is disposed in the tube such that the first surface of the deformation element faces the lumen of the tube and such that the sensor lug projects into the lumen.

24. The measurement system according to claim 23, further comprising a resistance element disposed in the lumen of the tube upstream of the sensor, relative to a direction of flow of the fluid, which resistance element is configured to generate about a Kármán vortex street in the flowing fluid.

25. The measurement system according to claim 23, wherein the sensor lug has a length measured as a minimum distance between a proximal end of the sensor lug, which proximal end adjoins the deformation element, to a distal end of the sensor lug, which distal end is remote from the deformation element or the first surface of the deformation element, wherein the length corresponds to less than 95% of a caliber of the tube and/or more than one half of the caliber of the tube.

26. The measurement system according to claim 22, further comprising a tube configured to be inserted into a course of the pipeline, the tube including a lumen adapted to guide the fluid flowing in the pipeline,
wherein a wall of the tube including an opening, the opening including a socket configured to hold the deformation element on the wall, and
wherein the sensor is disposed in the opening such that the deformation element covers and hermetically seals the opening and such that the first surface of the deformation element faces the lumen of the tube, wherein the sensor lug projects into the lumen.

27. A sensor for detecting pressure fluctuations in a Kármán vortex street formed in a flowing fluid, the sensor comprising:
a deformation element, which is flat at least in sections and includes a planar first surface and an opposite planar second surface;
a sensor lug extending from the first surface of the deformation element;
a connection sleeve extending from the deformation element;
a transducer element disposed within the connection sleeve and contacting the second surface of the deformation element with a first contact surface as to generate an electrical sensor signal representing temporally changing movements of the sensor lug and/or temporally changing deformations of the deformation element;
a compensating element, which is rod-shaped or planar or sleeve-shaped, extending from the second surface of the deformation element and configured to compensate forces and/or torques resulting from common movements of the deformation element and the sensor lug; and
a fastener disposed within the connection sleeve and mechanically connected thereto and configured to fix the transducer element in the connection sleeve,
wherein the fastener includes a cylindrical spring assembly formed of at least two stacked disk springs, and
wherein the disk springs are adapted to elastically deform by exerting a pressing force, which holds the transducer element against the deformation element.

28. The sensor according to claim 27, wherein at least one of:
the compensating element extends through the spring assembly such that a longitudinal, main axis of inertia of the compensating element and a longitudinal, main axis of inertia of the spring assembly extend parallel and coincident to each other, and/or such that the spring assembly and the compensating element do not contact each other;
the deformation element and the compensating element are integrally bonded to each other;
the sensor lug and the compensating element are arranged in alignment with each other;
the compensating element and the deformation element are disposed and aligned with respect to each other such that a main axis of inertia of the deformation element extends as an extension parallel to a main axis of inertia of the compensating element and coincides therewith;
the deformation element and the compensating element are parts of one and the same monolithic molded component such that the sensor lug, deformation element and compensating element are parts of said molded component, and/or such that the connection sleeve, deformation element and compensating element are parts of said molded component;
the deformation element comprises a stainless steel or a nickel-based alloy; and
the deformation element and the compensating element consist of a same material such that the sensor lug, deformation element and compensating element consist of the same material and/or the connection sleeve, deformation element and compensating element consist of the same material.

29. A method comprising:
measuring a flow parameter of a fluid flowing in a pipeline using the measurement system according to claim 28, wherein the flow parameter is at least one of a flow velocity, a volume flow rate and a mass flow rate,
wherein a temperature of the fluid is at least temporarily more than 200° C., and/or wherein the fluid acts, at least temporarily, with a pressure of more than 100 bar on the deformation element and/or the sensor lug of the sensor.

30. The method of claim 29, wherein the fluid is steam.

31. A method comprising:
measuring a flow parameter of a fluid flowing in a pipeline using the measurement system according to claim 28, wherein the flow parameter is at least one of a flow velocity, a volume flow rate and a mass flow rate,
wherein a temperature of the fluid is at least temporarily more than 200° C., and/or wherein the fluid acts, at least temporarily, with a pressure of more than 100 bar on the deformation element and/or the sensor lug of the sensor.

32. The method of claim 31, wherein the fluid is steam.

* * * * *